April 10, 1928.
P. E. EDELMAN
1,665,847
RADIO RECEIVING SYSTEM
Filed June 5, 1922
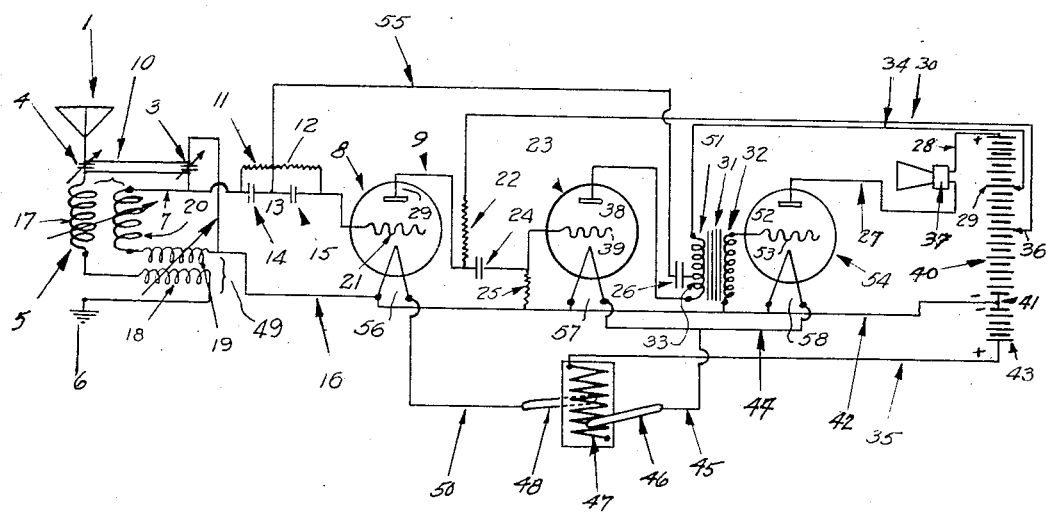
INVENTOR
Philip E. Edelman Patented Apr. 10, 1928.

1,665,847

UNITED STATES PATENT OFFICE.

PHILIP E. EDELMAN, OF CHICAGO, ILLINOIS.

RADIO RECEIVING SYSTEM.

Application filed June 5, 1922. Serial No. 566,132.

My invention relates to improvements in a radio receiver suitable for reception of broadcasted programs and the objects are to provide improved circuit arrangements therefor, to obtain improved energy pick-up and amplification thereof, increasing the amplification to obtain good volume of reproduction without circuit noises. I attain these objects by the circuit arrangement illustrated by way of example in the accompanying drawing, in which the figure is a diagram of a suitable embodiment of my invention. While I am showing a specific example of my invention, various changes may be made therefrom within the scope of the appended claims.

The incoming radiant energy is picked up preferably by a miniature sized aerial 1. Aerial 1 can be conveniently accommodated in a room or cabinet in which apparatus is located, and connects via wire 2 to tuning condenser 4 in series with inductance 17 and 18 comprising a primary winding of a variometer 5 which is connected to ground 6.

Energy is transferred via coupling 49 of variometer 5 to secondary coils 19 and 20 thereof which are in shunt to tuning condenser 3 which is mechanically connected to condenser 4 by mechanical link 10. Variometer 5 is arranged as shown so that winding 17 is continuously coupled to winding 20 while winding 18 is continuously coupled to winding 19, and at the same time a variometer is comprised by coils 17 and 18, also by coils 19 and 20, so that efficient energy transfer via coupling 49 is maintained for each adjustment of variometer 5.

Wire 16 and wire 7 connect from coils 19 and 20 as input to vacuum tube 8. Condensers 14 and 15 are series connected between wire 7 and grid 21 of vacuum tube 8. Resistances 11 and 12 are shunted around condensers 14 and 15. Condensers 14 and 15 are selected of suitable small capacity and resistances 11 and 12 are made of suitable high resistance.

The plate 29 of vacuum tube 8 connects via wire 9 to resistance 22 and condenser 24. Resistance 22 connects via wire 30 to terminal 36 of power supply 40. Condenser 24 also connects to resistance 25 and to grid 39 of vacuum tube 23. Plate 38 of vacuum tube 23 connects to coil portion 33 of transformer primary winding 51 which latter is connected by wire 34 to a higher potential tap of power supply 40 such as 29. Coil portion 33 is selected with relatively few turns so that condenser 26 can by-pass energy therefrom to the middle junction 13 between resistances 11 and 12 via wire 55. Coil portion 33 and condenser 26 can be selected to pass either audio frequency or radio frequency energy or both, it being understood that only a small amount of energy is to be fed back to junction 13 to affect grid 21 of the preceding tube 8. Core 31 couples primary winding 51 to secondary winding 32 which feeds audio frequency energy to grid 53 of vacuum tube 54. Plate 52 of vacuum tube 54 connects by wire 27 to reproducer 37 which latter connects by wire 28 to the highest potential terminal of power supply 40. The negative terminal of power supply 40 connects at 41 via wire 42 to the filaments of vacuum tubes 8, 23 and 54. Filament power supply 43 connects via wire 35 to rheostat 47. One arm of rheostat 47 is 48 and connects via wire 50 to the filament 56 of vacuum tube 8. Another contact arm 46 on rheostat 47 connects to filament 57 of vacuum tube 23 and filament 58 of vacuum tube 54 via wires 45 and 44.

This novel arrangement of circuits produces unusual results. Firstly it will be observed that the double variometer 5 affords good energy transfer from pick-up circuit 1, 2, 4, 17, 18, 6 to the grid circuit of vacuum tube 8. The continuous coupling of variometer 5 remains good over the range of adjustments made. Condensers 14 and 15 with resistances 11 and 12 serve several functions in transferring energy to grid 21 of vacuum tube 8 so that tube 8 acts in a plurality of purposes, amplifying the energy transferred to it via variometer 5 as well as energy transferred thereto via wire 55 from by-pass condenser 26 feeding energy thereto from plate 38 of vacuum tube 23. Resistances 11 and 12 also serve to prevent audio frequency howl noises by reducing the current fed via wire 55 to values which grid 21 of vacuum tube 8 can operatively handle. Probably some detector action occurs in tube 8 and if incomplete can be completed by vacuum tube 23, which also operates in a plurality of functions at both radio frequency and audio frequency current variations. Vacuum tube 54 serves for audio frequency amplification but the reproducer 37 is prevented from undesired audio whistling reproduction by the expedient of having vacuum tube 8 operated at lower plate voltage than vacuum tube 23 which in turn operates at lower plate voltage than vacuum tube 54. Mechanical link 10 serves to effect simultaneous change of tuning range of circuits including condensers 3 and 4. The various circuit constants can be selected as is customary in the art according to the range of frequencies to be amplified. Radio frequency currents can easily pass via condensers 14 and 15 but are substantially barred by resistances 11 and 12, though the latter can pass continuous current or low frequency currents. Grid 21 of vacuum 8 is thus prevented from choking up with accumulated negative charge or from being overloaded with input capable of sustaining audio howl currents. The success of this arrangement depends on keeping the value of the currents fed back to the first tube 8 from the second tube 23 to small quantity able to operate grid 21 without overloading or production of audio frequency oscillations. Very good amplification can thus be had with faithful reproduction free from objectionable noises howls or squeals.

What I claim is:

1. In a radio receiver including a series of vacuum tubes having input and output circuits, a grid input circuit for one of said vacuum tubes, a plate output circuit for another of said vacuum tubes succeeding said first named vacuum tube in said series, and a resistance connected to feed energy from said last named plate output circuit via said resistance to the grid of said first named vacuum tube, whereby a limited amount of said output circuit energy is applied to said grid of said first named vacuum tube under the control of said resistance.

2. In a radio receiver including a series of vacuum tubes having input and output circuits, a grid input circuit element for one of said vacuum tubes comprising a resistance in two sections having a common junction, capacity shunted around said resistance, and means to feed a limited amount of output energy from a succeeding vacuum tube of said series to said input circuit via said common junction.

3. In a radio receiver including a series of vacuum tubes having input and output circuits, a grid circuit for one of said vacuum tubes including resistance shunted by capacity with a tap connection comprised in said resistance and means to feed a limited amount of output energy from a succeeding vacuum tube of said series to said grid circuit via said tap connection whereby said limited amount of output energy is re-amplified without building up undesired energy oscillations.

4. In a radio receiver including a series of vacuum tubes having input and output circuits successively coupled, a grid circuit for one of said vacuum tubes arranged to transfer energy at both radio and audio frequencies thereto and including a series connected current control device therefor, an output circuit for a succeeding vacuum tube of said series having means to by-pass a portion of the output energy thereof at both radio frequency and audio frequency to said grid circuit via said series connected control device of said grid circuit and limited under control thereof whereby a plurality of energy amplifications may be obtained via said vacuum tubes under control of said series control device, and an output circuit for said amplified energy.

5. In a radio receiver having a series of vacuum tubes with input and output circuits successively coupled, a grid input circuit for one of said vacuum tubes including a grid current control device to pass limited amounts of input energy at radio and audio frequencies, means to feed a portion of the output energy from another of said vacuum tubes in said series to said current control device, an output amplifier connected to receive the remainder of said output energy, a plate current supply for all of said vacuum tubes tapped at different potentials to supply potentials to each of said vacuum tubes proportioned according to the increased energy amplified in successive vacuum tubes of said series, and a common filament current supply for said vacuum tubes.

6. In a radio receiver including a series of vacuum tubes having input and output circuits, an input circuit for the first of said vacuum tubes, a current control device comprised with said input circuit, a coupling between said first and second vacuum tubes of said series, an output circuit for said second vacuum tube, a condenser connected between said last named output circuit and said current control device to by-pass a small amount of said output circuit's energy to said control device, a third vacuum tube of said series connected to said output circuit, a reproducer operated via said last named vacuum tube, a common source of current supply for said vacuum tubes, and means to energize the plate circuits of each of said vacuum tubes from said source of current supply at potentials proportioned to the increasing amount of energy amplified in said successive vacuum tubes of said series.

In witness whereof I have hereunto set my hand this third day of June, 1922, at New York, New York.

PHILIP E. EDELMAN.